US012621327B1

(12) United States Patent
Dysart et al.

(10) Patent No.: US 12,621,327 B1
(45) Date of Patent: May 5, 2026

(54) DETECTION OF ANOMALOUS ACTIVITIES IN AN ENTERPRISE NETWORK

(71) Applicant: Trend Micro Incorporated, Tokyo (JP)

(72) Inventors: Michael Dysart, Ottawa (CA); Partheeban Chandrasekaran, Eganville (CA)

(73) Assignee: Trend Micro Incorporated, Tokyo (JP)

( * ) Notice: Subject to any disclaimer, the term of this patent is extended or adjusted under 35 U.S.C. 154(b) by 156 days.

(21) Appl. No.: 18/582,315

(22) Filed: Feb. 20, 2024

(51) Int. Cl.
*H04L 9/40* (2022.01)

(52) U.S. Cl.
CPC ...... *H04L 63/1425* (2013.01); *H04L 63/1433* (2013.01)

(58) Field of Classification Search
CPC ..................... H04L 63/1425; H04L 63/1433
See application file for complete search history.

(56) References Cited

U.S. PATENT DOCUMENTS

| | | | |
|---|---|---|---|
| 10,044,745 B1 | 8/2018 | Jones et al. | |
| 11,907,368 B1 * | 2/2024 | Ye | G06F 21/554 |
| 2015/0244734 A1 * | 8/2015 | Olson | G06F 21/577 |
| | | | 726/25 |
| 2019/0379678 A1 | 12/2019 | McLean et al. | |
| 2020/0167787 A1 * | 5/2020 | Kursun | H04L 67/306 |
| 2020/0169483 A1 * | 5/2020 | Kursun | G06Q 20/3678 |
| 2021/0152567 A1 | 5/2021 | Huston, III et al. | |

| | | | |
|---|---|---|---|
| 2021/0194905 A1 * | 6/2021 | Fong | H04L 63/1425 |
| 2022/0021697 A1 * | 1/2022 | Adamson | H04L 63/20 |
| 2022/0038491 A1 * | 2/2022 | Hadar | H04L 63/1433 |

(Continued)

FOREIGN PATENT DOCUMENTS

| | | | | | |
|---|---|---|---|---|---|
| CN | 112100545 A | * | 12/2020 | ......... | H04L 63/1433 |
| CN | 114401136 A | * | 4/2022 | ......... | H04L 63/1416 |

(Continued)

OTHER PUBLICATIONS

Nino Shervashidze, Pascal Schwitzer, Erik Jan van Leeuwen, Kurt Mehlhorn, Karsten M. Borgwardt, "Weisfeiler-Lehman Graph Kernels", Published 2011, Downloaded Nov. 20, 2023, https://www.jmlr.org/papers/volume12/shervashidze11a/shervashidze11a.pdf.

(Continued)

*Primary Examiner* — Sarah Su
(74) *Attorney, Agent, or Firm* — Beyer Law Group LLP

(57) ABSTRACT

An enterprise network has network assets, with each network asset having a network interface. A network graph has the network assets as nodes and connections between network interfaces of network assets as edges. An activity graph has nodes and edges, with each node representing a logical resource that performs an activity on the enterprise network, and each edge representing a relationship between the logical resources. Subgraphs of the activity graph are aligned to subgraphs of the network graph to create a mapping based on network assets associated with activities. Activity subgraphs that are aligned to the same network subgraph are compared for similarity to detect anomalous activities. The network graph is displayed at different hierarchical levels as a visualization on a display screen, with risk assessments overlaid on corresponding nodes on the visualization.

9 Claims, 15 Drawing Sheets

(56) References Cited

U.S. PATENT DOCUMENTS

| | | | | |
|---|---|---|---|---|
| 2022/0159026 A1* | 5/2022 | Kazemeyni | ......... | H04L 63/1425 |
| 2022/0191230 A1 | 6/2022 | Morgan | | |
| 2022/0407891 A1* | 12/2022 | Albanese | ............. | H04L 63/205 |
| 2023/0036609 A1* | 2/2023 | Chiu | ................... | H04L 63/1425 |
| 2023/0344856 A1* | 10/2023 | Mosko | ............... | H04L 63/1425 |
| 2023/0370452 A1* | 11/2023 | Mannengal | ............. | H04L 41/12 |
| 2024/0267400 A1* | 8/2024 | Gazit | .................... | G06F 21/552 |
| 2025/0030725 A1* | 1/2025 | Fellows | ............. | H04L 63/1433 |
| 2025/0358316 A1* | 11/2025 | Wen | .................... | H04L 63/1425 |

FOREIGN PATENT DOCUMENTS

| | | | | | |
|---|---|---|---|---|---|
| CN | 114826726 A | * | 7/2022 | ......... | H04L 63/1433 |
| CN | 118802341 A | * | 10/2024 | ............. | H04L 67/02 |
| CN | 118827222 A | * | 10/2024 | ............. | H04L 41/16 |
| CN | 119210889 A | * | 12/2024 | ............. | G06N 3/098 |
| EP | 1335557 A1 | * | 8/2003 | ............. | H04L 43/00 |
| EP | 4287559 A1 | * | 12/2023 | ......... | H04L 63/1425 |
| WO | WO-2017019534 A1 | * | 2/2017 | ......... | G06Q 10/0635 |
| WO | WO-2021155971 A1 | * | 8/2021 | .......... | G06F 21/552 |
| WO | WO-2025034196 A1 | * | 2/2025 | .......... | G06F 21/554 |
| WO | WO-2025148367 A1 | * | 7/2025 | .......... | H04L 41/069 |

OTHER PUBLICATIONS

"Asset (Computer Security)", Wikipedia, Downloaded Jan. 29, 2024, https://en.wikipedia.org/wiki/Asset_(computer_security).
"Directed Acyclic Graph", Wikipedia, Downloaded Nov. 10, 2023, hups://en.wikipedia.org/wiki/Directed_acyclic_graph.
"More than a Number: Your Risk Score Explained: Understanding Risk Score Calculations", Trend Micro, Jan. 2023, Downloaded Jan. 10, 2024, https://www.trenddefense.com/datasheets/detect-reponse/rpt-risk-score-explained.pdf.

* cited by examiner

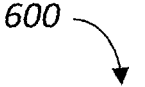

600

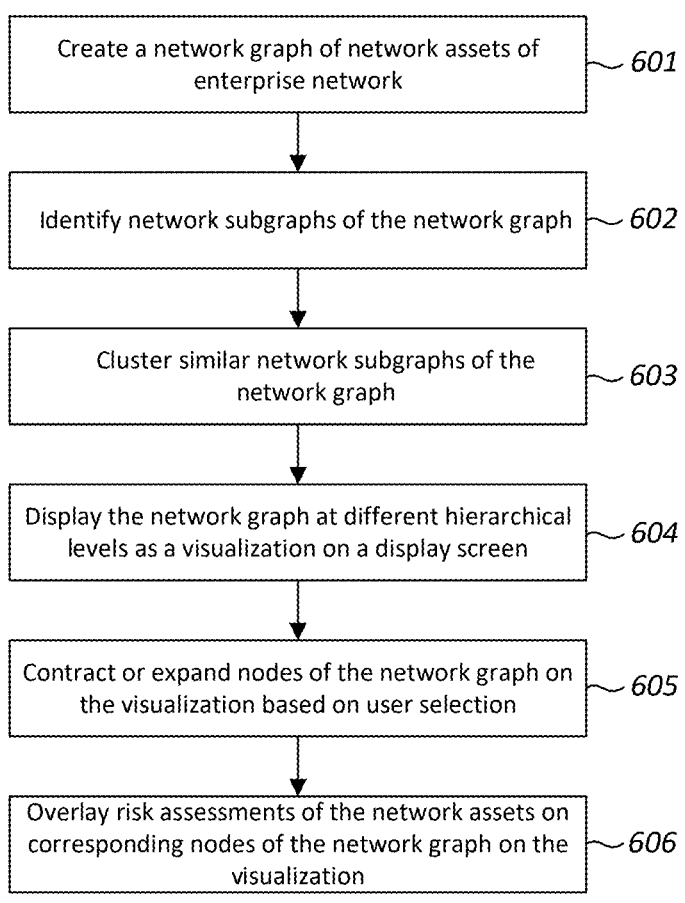

Create a network graph of network assets of enterprise network — 601

Identify network subgraphs of the network graph — 602

Cluster similar network subgraphs of the network graph — 603

Display the network graph at different hierarchical levels as a visualization on a display screen — 604

Contract or expand nodes of the network graph on the visualization based on user selection — 605

Overlay risk assessments of the network assets on corresponding nodes of the network graph on the visualization — 606

FIG. 14

DETECTION OF ANOMALOUS ACTIVITIES IN AN ENTERPRISE NETWORK

TECHNICAL FIELD

The present disclosure is directed to cybersecurity.

BACKGROUND

Enterprises maintain computer networks that connect a multitude of computers across multiple geographic regions and availability zones. An enterprise network can include a large number of backend servers that run in the cloud or on premises and connected to an even larger number of internal and external clients that run on machines in other locations. Needless to say, today's enterprise networks are very complicated, and understanding the relationships between network assets on an enterprise network to identify vulnerabilities can be extremely difficult.

Unfortunately, enterprise networks are under constant threat of cyberattacks. Although there are commercially-available cybersecurity components for monitoring the enterprise network for potential cyber threats, the amount of security-related information the cybersecurity components generate can be overwhelming. More particularly, cybersecurity components can assess the security risks in an enterprise network, but the assessment is presented in a form that is difficult to understand due to the size and complexity of the enterprise network.

Risk assessments may be included as items in a list. Listing can be effective, especially when combined with sorting and filtering. However listing often fails to provide context. That is, it is often difficult to understand which items in a list are related. It is not realistic to expect security personnel to browse lists that have hundreds of thousands of items. It can be difficult to browse and produce an overview from a plain list.

Searching risk assessments with queries is a powerful way to find items of interest. However, searching with queries requires upfront knowledge about what information might be available or useful. Security personnel typically need years of experience to effectively perform the search. Also, the result of the search is often a list, which as noted can be difficult to use and interpret.

Network graphs are a way to visualize network connections. Larger network graphs that contain hundreds of thousands of nodes are often difficult to understand, so risk assessments presented as part of conventional network graphs do not provide understandable insight to the security risks of the enterprise network.

Knowledge graphs are a way to visualize related information across different domains. Knowledge graphs often require an item of interest, which is usually chosen from a list. The number of items shown are usually small, since each item contains its own related information across domains, which often causes the amount of information to be displayed to be even larger per item compared to more focused graphs.

Architecture diagrams are a way to gain an overview of how the enterprise network works. Architecture diagrams are manually created by system architects and may not reflect real world implementation. They are at higher level and are meant to aid in understanding the overall network. Architecture diagrams are often accompanied with short narratives embedded in the diagram to further aid in understanding. However, architecture diagrams are often focused more on how the network works, and not security risks of the network.

What is needed is a way for security personnel to readily evaluate risk assessments and be alerted of anomalous activities in the enterprise network.

BRIEF SUMMARY

In one embodiment, an enterprise network has network assets, with each network asset having a network interface. A network graph has the network assets as nodes and connections between network interfaces of network assets as edges. An activity graph has nodes and edges, with each node representing a logical resource that performs an activity on the enterprise network, and each edge representing a relationship between the logical resources. Subgraphs of the activity graph are aligned to subgraphs of the network graph to create a mapping based on network assets associated with activities. Activity subgraphs that are aligned to the same network subgraph are compared for similarity to detect anomalous activities. The network graph is displayed at different hierarchical levels as a visualization on a display screen, with risk assessments overlayed on corresponding nodes on the visualization.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 14 shows a flow diagram of a method of providing risk assessments of an enterprise network, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
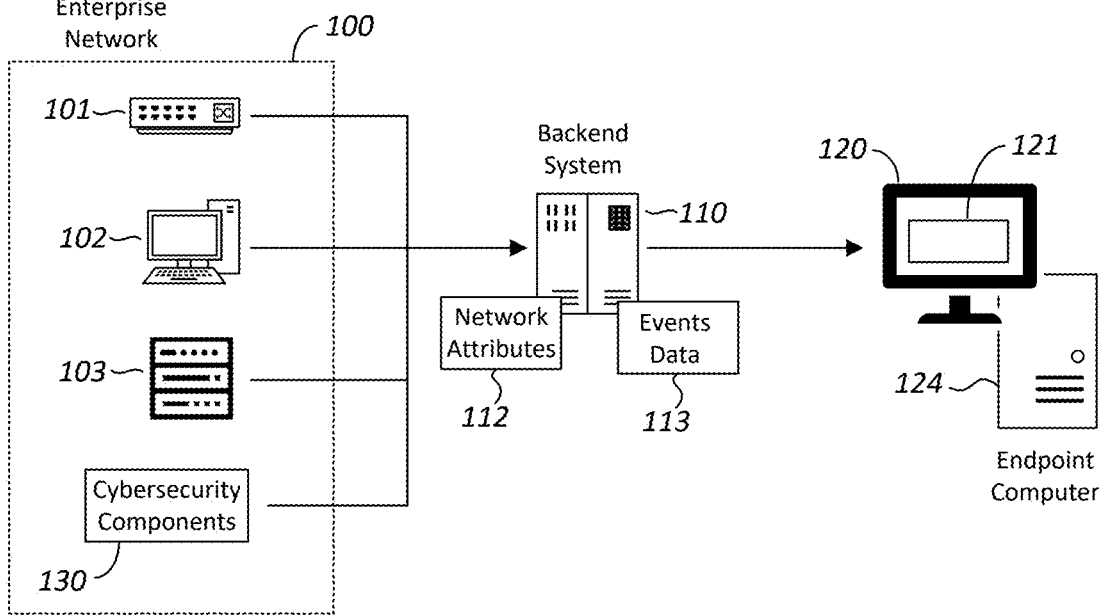
FIG. 1 shows a block diagram of an enterprise network, in accordance with an embodiment of the present invention.

FIG. 1 shows a block diagram of an enterprise network 100, in accordance with an embodiment of the present invention. The enterprise network 100 may be that of a private company, government, educational institution, etc. The enterprise network 100 includes a plurality of network assets 101, 102, 103, etc. that may be deployed across a plurality of geographical regions, a plurality of geographical zones in each geographical region, and one or more subnets in each zone. A region may be a country, and a zone may be a part of the country (e.g., state, province). The enterprise network 100 is divided into regions, zones, and subnets for illustration purposes only. As can be appreciated, an enterprise network may be divided into different network partitions or segments depending on the particulars of the enterprise network.

A network asset is a computing component that has an associated network interface for network communication. The network asset is addressable by way of its network interface address, such as its Internet Protocol (IP) address. The network asset may comprise a hardware computing component, such as a server computer, desktop computer, network appliance (e.g., network address translation (NAT) computer, load balancer (LB) computer, router, gateway), database server, network attached storage, cloud computing infrastructure (e.g., Amazon Web Services™ platform), etc. The network asset may also comprise a virtual computing component that runs on a hardware computing component. For example, the network asset may be a virtual machine instance that is addressable on a virtual computer network that is part of the enterprise network 100.

A network asset has corresponding network attributes, which include its network interface and associated address, location in the enterprise network 100 (e.g., region, zone, subnet, virtual private cloud, virtual machine instance), and role in the enterprise network 100 (also referred to as type of the network asset). The network attributes may also include the owner (e.g., user, department) of the network asset and other information that allows the network asset to be distinguished from other network assets of the enterprise network 100.

The enterprise network 100 includes cybersecurity components, which are schematically illustrated as a block 130, as protective measures against cyberattacks. The cybersecurity components may comprise commercially-available cybersecurity components, such as those from Trend Micro Incorporated. The cybersecurity components may be distributed across the enterprise network 100 in the form of security appliances that monitor network traffic and enforce network policies, antivirus software running on individual network assets, endpoint agents that run and collect information on network assets, etc. The cybersecurity components 130 may employ conventional algorithms to generate risk assessments of the enterprise network 100. A risk assessment may yield a risk score (e.g., a numerical value that can be compared to a risk threshold) or a risk level (e.g., low, medium, high). A risk score may be a range of numerical values from 0-100, with 0 indicating zero risk and 100 indicating critical risk; the higher the risk score, the greater the risk posed to the enterprise network. A risk level may indicate a range of risk scores. For example, a risk score of 0-30 for low risk; a risk score of 31-69 for medium risk; and a risk score of 70-100 for high risk. A risk assessment may be for a particular network asset or an aggregation of risk assessments for a group of network assets.

A backend system 110 may comprise a workstation, dedicated server computer, interconnected computers, a cloud computing infrastructure, or other computer system. The backend system 110 collects network attributes (see FIG. 1, 112) of network assets and events data (FIG. 1, 113) of the enterprise network 100. The backend system 110 is adapted to transform the network attributes into a network graph, identify hierarchical subgraphs ("network subgraphs") of the network graph, cluster similar network subgraphs, transform activities in the events data into an activity graph, identify hierarchical subgraphs ("activity subgraph") of the activity graph, and align the activity subgraphs to the network subgraphs. The backend system 110 is adapted to compare activity subgraphs that are aligned to the same network subgraph for similarity to detect an anomalous activity in the activity subgraphs.

Network attributes of network assets may be collected locally on the network assets (e.g., by endpoint agents running on the network assets), from network traffic collected by network assets or cybersecurity components that are configured as a network appliance, from cybersecurity orchestration application programming interfaces (APIs) running on the network assets that work in conjunction with cybersecurity components, etc. On the backend system 110, network attributes of a network asset may be enriched by adding ownership and other information that may not be readily available locally on the network asset or from network traffic of the network asset.

Events data may comprise records of activities (i.e., computer operations) on the enterprise network 100 involving one or more network assets. The events data includes an identification of network assets associated with an activity, such as the network asset where the activity occurred, the network asset that was accessed, etc. An activity may also be between network assets, such as a user on a network asset accessing another network asset, a network asset connecting to another network asset, a network asset traversing to another network asset to communicate with yet another network asset, a network asset accessing (e.g., writing, reading, or storing data) another network asset, etc. The events data of activities may be collected by cybersecurity components as part of an extended detection and response (XDR) system, managed detection and response (MDR) system, on premise monitoring system, or other commercially-available event monitoring system. For example, the events data may be from the XDR system of Trend Micro Incorporated.

A network subgraph may comprise a single node or a plurality of interconnected nodes along a path of the network graph. Network subgraphs provide several hierarchical levels of the network graph. On demand, the network graph may be forwarded from the backend system 110 to an endpoint computer 124 employed by a user or security personnel. On the endpoint computer 124, the network graph may be displayed as a visualization 121 on a display screen 120 of the endpoint computer 124. The visualization 121 may be part of an interface of an XDR system, MDR system, on premise monitoring system, etc. employed by the enterprise network 100.

The visualization 121 may include risk assessments in the form of risk scores that are overlaid on nodes of the network graph to allow security personnel to readily evaluate the risks of the enterprise network 100. A risk score of a network asset may be overlaid on a discrete node that represents a single network asset on the network graph, and an aggregated risk score may be overlaid on a common node that represents a plurality of network assets that are in hierarchical levels as subgraphs. The aggregated risk score is an aggregation of the risk scores of the plurality of network assets represented by the common node. Security personnel may select (e.g., by a mouse click) a common node, and other common nodes within the common node, etc. to explore the security risks of the enterprise network 100 at various hierarchical levels. For example, an activity graph may be overlaid on discrete and common nodes of the network graph to identify individual and/or a plurality of network assets that are associated with activities in the activity graph. This is particularly helpful when the overlaid activity graph includes an activity subgraph that has been found to be anomalous.

Figure 2:
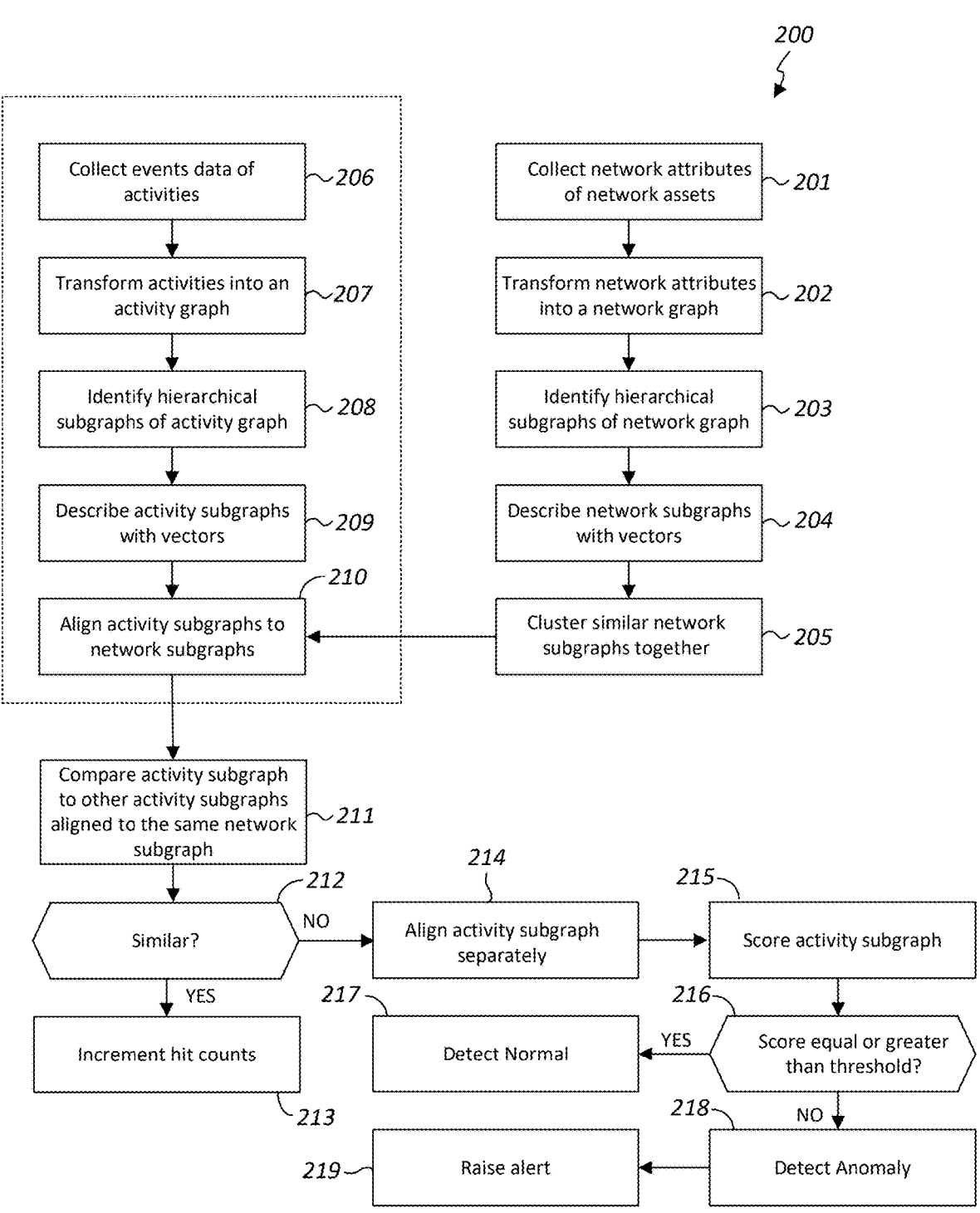
FIG. 2 shows a flow diagram of a method of detecting anomalous activities in an enterprise network, in accordance with an embodiment of the present invention.

FIG. 2 shows a flow diagram of a method 200 of detecting anomalous activities in an enterprise network, in accordance with an embodiment of the present invention. In one embodiment, the method 200 is performed on a backend system, by or in conjunction with program code executed by at least one processor of the backend system.

In step 201, network attributes of network assets are collected in a backend system. The collected network attributes include an identification of network assets, network interfaces of the network assets, and connections between network interfaces.

In step 202, the collected network attributes are transformed into a network graph that comprises a set of nodes and edges. Network assets are nodes of the network graph. Connections between network interfaces are edges of the network graph. In other words, each node represents a network asset and an edge connecting two nodes represent a connection between network interfaces of two network assets represented by the two nodes. As can be appreciated, the network graph can get very complicated due to the large number of network assets in the enterprise network. Embodiments of the present invention further process the network graph to facilitate anomaly detection as follows.

In step 203, hierarchical subgraphs of the network graph ("network subgraphs") are identified. A network subgraph is a subset of the network graph, comprising of a subset of the nodes and a subset of the edges of the network graph. The network subgraph maintains the connections that are present in the network graph. The network subgraphs are organized in a hierarchical manner, meaning there are multiple hierarchical levels. Nodes in a network subgraph represent network assets that are densely connected, and often share common network attributes or fulfill similar roles within the enterprise network. Network subgraphs may be identified, for example, based on network attributes (e.g., known network connections) or by using a suitable community detection algorithm, such as the Louvain Method, Girvan-Newman Algorithm, etc.

In step 204, each of the network subgraphs is described with a vector based on their corresponding network attributes. For example, the network assets and network subgraphs may be described with vectors using the Weisfeiler-Lehman (WL) relabeling or other suitable graph kernel.

In step 205, similar network subgraphs are clustered together. In one embodiment, the clustering is based on their vectors. More particularly, vectors of two network subgraphs may be compared to determine if the two network subgraphs are similar. The resulting network graph now includes clustered network subgraphs.

In step 206, events data of activities are collected in the backend system.

In step 207, the activities are transformed into an activity graph. In an activity graph, nodes represent logical resources (e.g., users, processes, files, requests) that perform an activity using or through associated network assets. The edges represent causal action or relationship between logical resources, such as a user starting a process, or a process reading/writing to a file or sending a request to another network asset.

In step 208, hierarchical subgraphs of the activity graph ("activity subgraphs") are identified. An activity subgraph is a subset of the activity graph, comprising of a subset of the nodes and a subset of the edges of the activity graph. The activity subgraph maintains the connections that are present in the activity graph. The activity subgraphs are organized in a hierarchical manner, meaning there are multiple hierarchical levels. The causal nature of an activity graph naturally defines a tree-like directed graph, where branches in the tree are subgraphs of the activity graph. The activity subgraphs may thus be readily identified from node connections of the activity graph.

In step 209, each of the activity subgraphs is described with a vector based on their resource attributes, e.g., type (file, process, request) and connections to other resources. The activity subgraphs may be described with vectors using the Weisfeiler-Lehman (WL) relabeling or other suitable graph kernel.

In one embodiment, for ease of calculation, each of the network graph and the activity graph is considered a subgraph for alignment and similarity comparison purposes.

In step 210, the activity subgraphs are aligned to the network subgraphs (which now includes clusters) to generate an alignment graph based on network assets associated with activities in the activity subgraphs. By alignment, it is meant that an activity subgraph and a network subgraph with similar network assets are mapped to each other. In one embodiment, similarity between an activity subgraph and a network subgraph for alignment purposes is determined by calculating their Jaccard similarity value, and the activity subgraph is aligned to the network subgraph that yields the best Jaccard similarity value. An activity subgraph is discarded (i.e., not aligned) when it is not similar to any of the network subgraphs, i.e., the Jaccard similarity value is zero. As can be appreciated, other suitable similarity algorithm other than Jaccard similarity may also be employed to perform the alignment.

As a particular example, given a network subgraph having a first set of network assets consisting of computer A and computer B, and an activity subgraph having a second set of network assets consisting of computer A downloading from computer C, the intersection of the first and second sets is computer A, and the union of the first and second sets is computers A, B, and C. In that example, the Jaccard similarity value between the network and activity subgraphs is the number of intersection elements divided by the number of union elements, i.e., ⅓ (i.e., A/(A+B+C)). The activity subgraph will be aligned to the network subgraph if ⅓ is the highest Jaccard similarity value obtainable for the activity subgraph when compared for similarity against network subgraphs of the network graph.

It is to be noted that steps 201-210 are performed for all existing and incoming collected events data and collected network attributes. Although, steps 201-205 will yield relatively stable network subgraphs (because network topology does not vary much), steps 206-210 may yield new activity subgraphs as new events data are collected. In a first iteration through the steps 201-210, an activity subgraph will be aligned to a network subgraph, which has no mapping to any activity subgraph at that time; the activity subgraph is not similar to non-existing "other activity subgraphs", but is normal in the first iteration. In other words, a first iteration through the method 200 will end at step 217, which is further explained below.

However, as more activity subgraphs are processed through the method 200, an activity subgraph that has gone through steps 206-210 may not be similar to other activity subgraphs that are already aligned to the same network subgraph. In that case, the method 200 continues to step 214, instead of ending at the step 213, to determine whether the activity subgraph is an anomaly as further explained below.

In step 211, each activity subgraph that is aligned to a network subgraph is compared for similarity to other activity subgraphs that are aligned to the same network subgraph (as the activity subgraph). The vector of the activity subgraph may be compared to a vector of each of the other activity subgraphs to determine if the activity subgraph is similar to any of the other activity subgraphs. Generally, vectors may be compared to determine similarity using a suitable vector similarity metric, such as cosine similarity, Euclidean distance, etc. The resulting similarity value may be compared to a primary threshold to determine similarity. In terms of statistics, the primary threshold is related to the Effect Size or Practical Significance of an activity subgraph compared to the other activity subgraphs that are aligned to the same network subgraph. The similarity value between vectors may be from 0 to 1, with 1 being most similar and 0 is not similar.

In step 212 to step 213, hit counts of activity subgraphs and network subgraphs that have been found to be similar to an activity subgraph are incremented (i.e., by one count); the activity subgraph is clustered with other similar activity subgraphs that are aligned to the same network subgraph. As will be more apparent below, the hit counts provide statistical significance to an activity subgraph that is not similar to any activity subgraph that is aligned to the same network subgraph.

In step 212 to step 214, an activity subgraph is aligned to the network subgraph, separate from other activity subgraphs that are aligned to the same network subgraph, when the activity subgraph is not similar to any of the other activity subgraphs. In other words, the activity subgraph is treated separately from, and not clustered with, the other activity subgraphs that are aligned to the same network subgraph.

In step 215, the activity subgraph is scored to generate an activity score, which is based on the total hit counts. The activity score may be: 1/total samples; newly added activity subgraph sample/total samples; etc., where "total samples" is the total hit counts.

In step 216, the activity score is compared to an activity threshold.

In step 216 to step 217, the activity subgraph is detected to be normal when the activity score is equal to or greater than the activity threshold.

In step 216 to 218, the activity subgraph is detected to be an anomaly when the activity score is less than the activity threshold. The vector similarity value at step 211 indicates practical significance, whereas the activity score at step 215 indicates statistical significance. An anomalous activity subgraph (i.e., one or more activities in the activity subgraph are anomalous) is detected when both significance measures are low or, put another way, when similarity is low and the total number of samples is high.

In step 219, an alert is raised in response to detecting the anomaly. The alert may be a notification displayed as a message on a display screen, an email message, or other way to inform security personnel of the enterprise network to further investigate the anomaly. For example, the alert may be a risk assessment that is overlaid on nodes of the network graph on a visualization.

FIGS. 3-13 provide examples that further illustrate the method 200.

Figure 3:
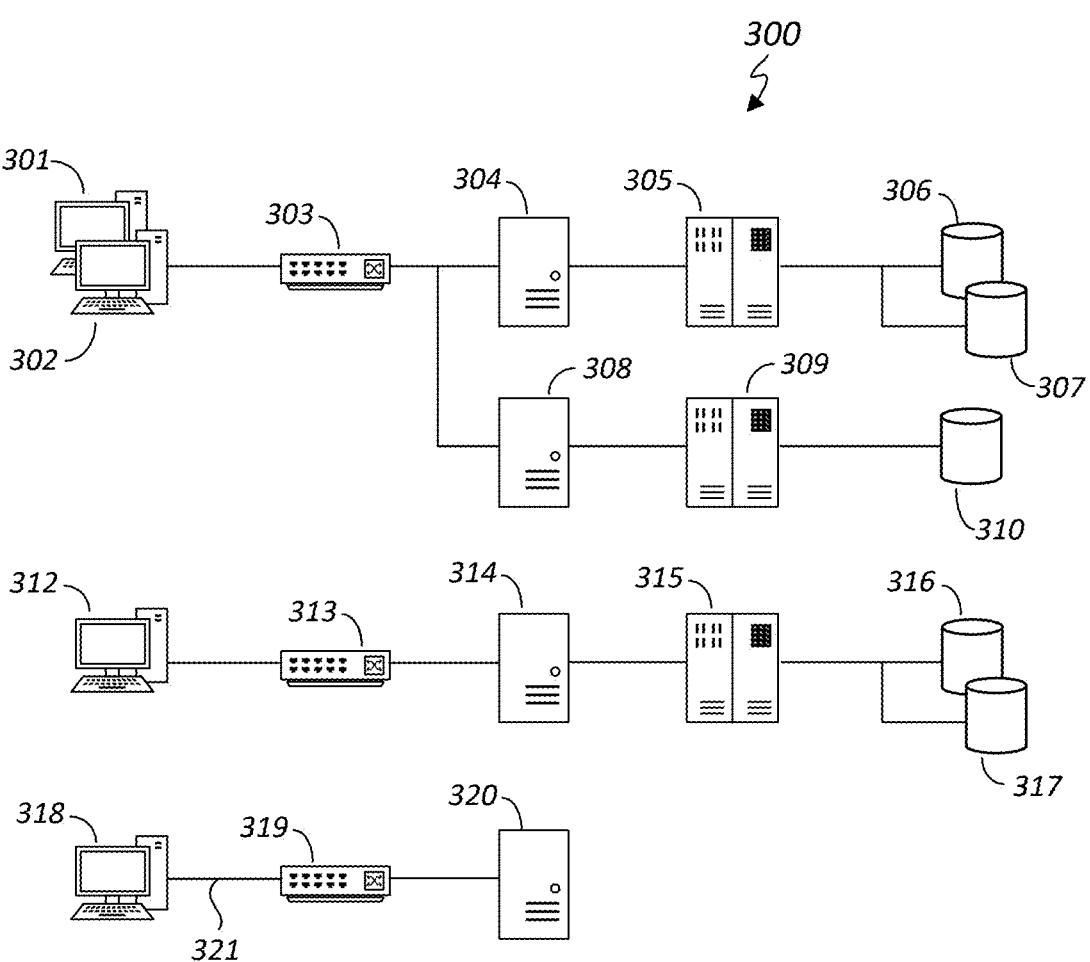
FIG. 3 shows an example network graph, in accordance with an embodiment of the present invention.

FIG. 3 shows an example network graph 300, in accordance with an embodiment of the present invention. In the network graph 300, the network assets (see FIG. 3, 301-310 and 312-320) are nodes, and the network interface connections between the network assets are edges that connect the nodes. For example, each of the network assets 318 and 319 is a node, and an edge 321 represents the connection between network interfaces of the network assets 318 and 319. As exemplified by the network assets 318-320, a network asset is not necessarily connected to the rest of the network assets of the enterprise network.

As a particular example, the network assets 301 and 302 may be desktop computers that are each connected to a network asset 303, which is a router or gateway. The network asset 304 may be a load balancing computer, the network asset 305 may be a compute server (i.e., for processing large amounts of data), and the network assets 306 and 307 may be database servers. As can be appreciated, these network types are given for illustration purposes only. The types of the network assets may vary depending on the particulars of the enterprise network.

Figure 4:
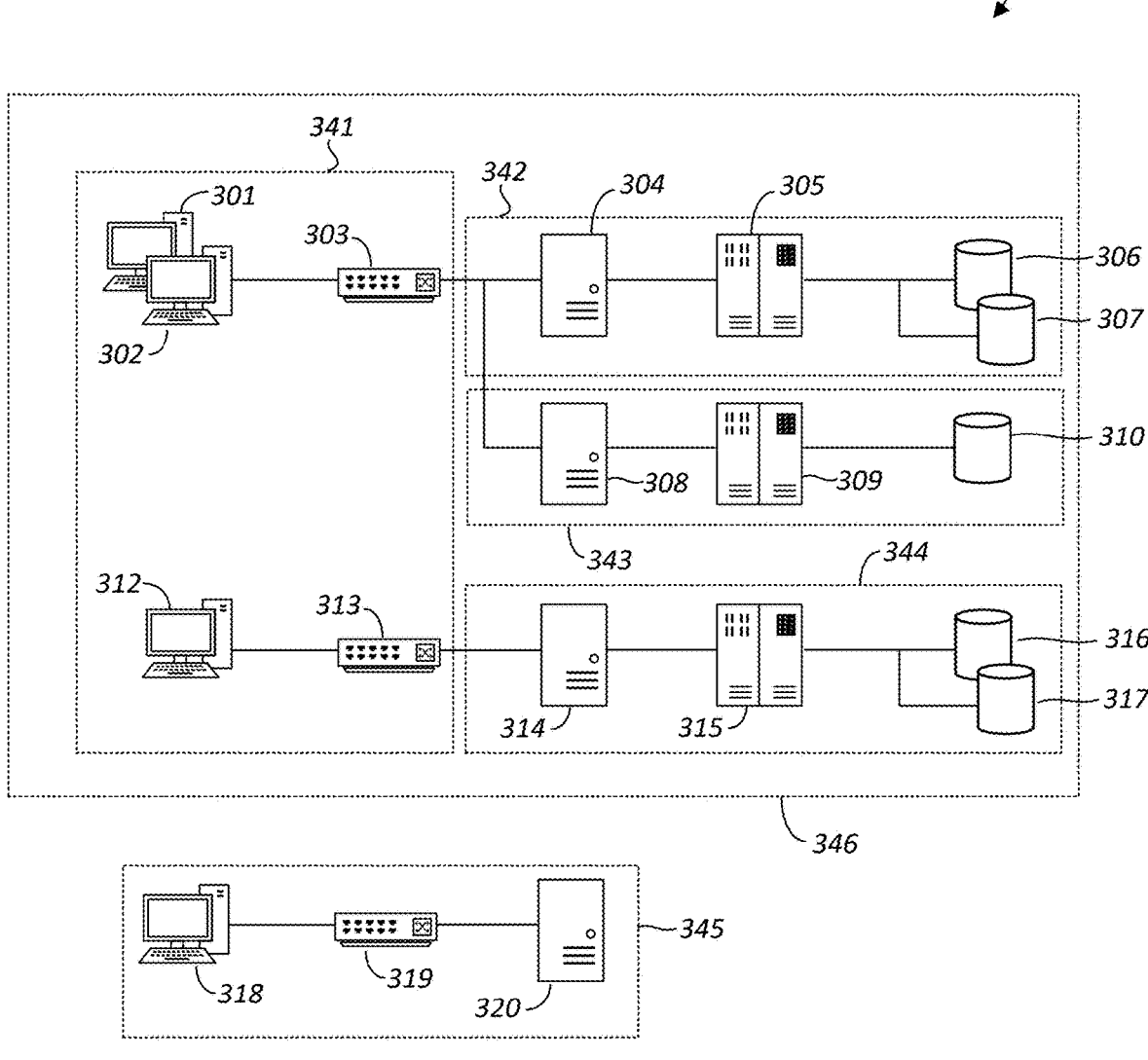
FIG. 4 shows network subgraphs of the network graph of FIG. 3, in accordance with an embodiment of the present invention.

FIG. 4 shows the network subgraphs of the network graph 300, in accordance with an embodiment of the present invention. In the example of FIG. 4, the network subgraphs are labeled as 341-346.

In the example of FIG. 4, the network subgraph 341 consists of network assets 301-303, 312, and 313; the network subgraph 342 consists of network assets 304-307; the network subgraph 343 consists of network assets 308-310; the network subgraph 344 consists of the network assets 314-317; the network subgraph 345 consists of network assets 318-320; and the network subgraph 346 consists of network assets 301-10 and 312-317. As can be appreciated, a single network asset may be a subgraph by itself or may belong to one or more subgraphs. Also, the number of network subgraphs in a network graph and the members of a network subgraph depend on the algorithm employed to identify the network subgraphs.

The network subgraphs 341-346 are hierarchical. The network graph 300 is a parent to children network subgraphs 341-346; the network subgraph 346 is a parent to children network subgraphs 341-344; the network subgraph 341 is a parent to children network subgraphs 342-344; etc.

Figure 5:
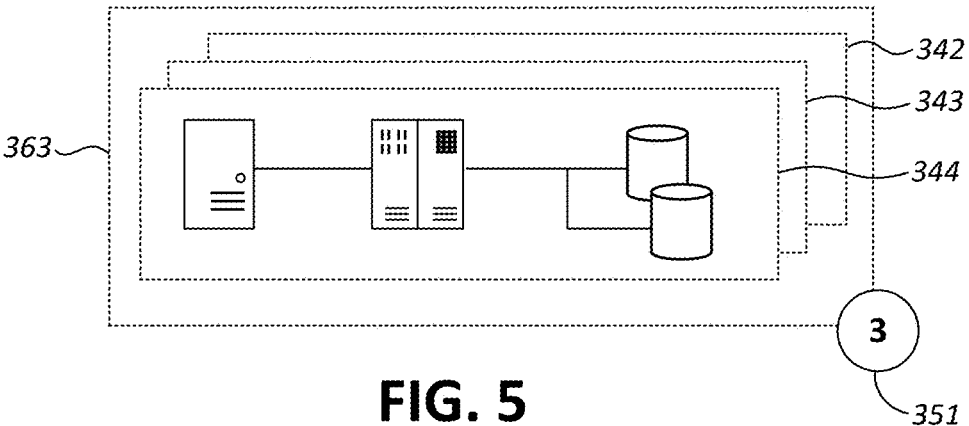
FIG. 5 illustrates clustering of network subgraphs of the network graph of FIG. 4, in accordance with an embodiment of the present invention.

FIG. 5 illustrates clustering of network subgraphs of the network graph 300, in accordance with an embodiment of the present invention. Each of the network subgraphs 341, 345, and 346 of the network graph 300 is not clustered with other network subgraphs. However, as illustrated in FIG. 5, the network subgraphs 342, 343, and 344 are clustered together into a subgraph 363. The circled value 351 indicates that there are three subgraphs in the cluster, i.e., network subgraphs 342-344.

As displayed on a visualization, the nodes of the network graph 300, as clustered, may be contracted to a single node that represents the entire network graph 300. Selecting that node on the visualization reveals a node that represents the network subgraph 346 and another node that represents the network subgraph 345. Selecting a node among the revealed nodes on the visualization further expands that node to reveal lower level nodes. For example, selecting the node that represents the network subgraph 346 reveals a node that represents the network subgraph 341 and another node that represents the network subgraph 363 (see FIG. 5). Selecting the node that represent the network subgraph 363 reveals a node that represents the network subgraph 342, a node that represents the network subgraph 343, and a node that represents the network subgraph 344. Selecting the node that represents the network subgraph 342 reveals a node that represents the network asset 304, a node that represents the network asset 305, a node that represents the network asset 306, and a node that represents the network asset 307; and so on.

Figure 6:
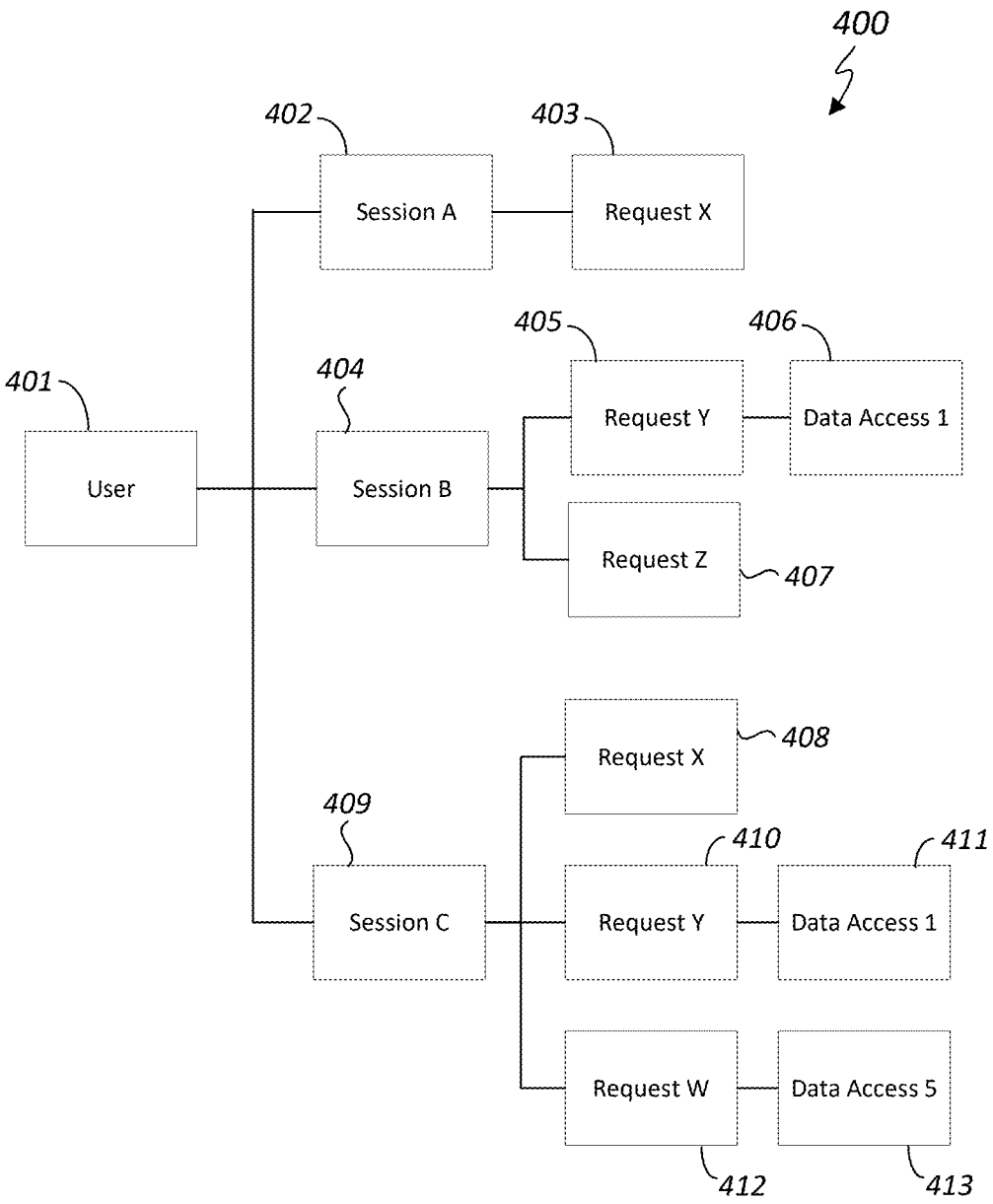
FIG. 6 shows an example activity graph, in accordance with an embodiment of the present invention.

FIG. 6 shows an example activity graph 400, in accordance with an embodiment of the present invention. The activity graph 400 includes nodes 401-413, each of which represents a logical resource that performs an activity on the enterprise network. A node of the activity graph 400 may have an associated network asset that can be mapped to network assets of a network subgraph for alignment purposes. A node of the activity graph 400 with no known associated network asset may be ignored for alignment purposes.

In the example of FIG. 6, the node 401 represents a user, the node 402 represents a session (Session A) initiated by the user to send a request for service (Request X) that is represented by the node 403. The nodes 402 and 403 may have the same or different associated network assets. For example, the node 402 may have an associated load balancer computer, whereas the node 403 may have an associated server computer. As another example, the node 404 may represent a session (Session B) initiated by the user to send a request for service (Request Y) that is represented by node 405 to access a database represented by the node 406. The node 406 may have an associated database server in that example. As can be appreciated, the activities of the activity graph 400 are provided for illustration purposes only.

Figure 7:
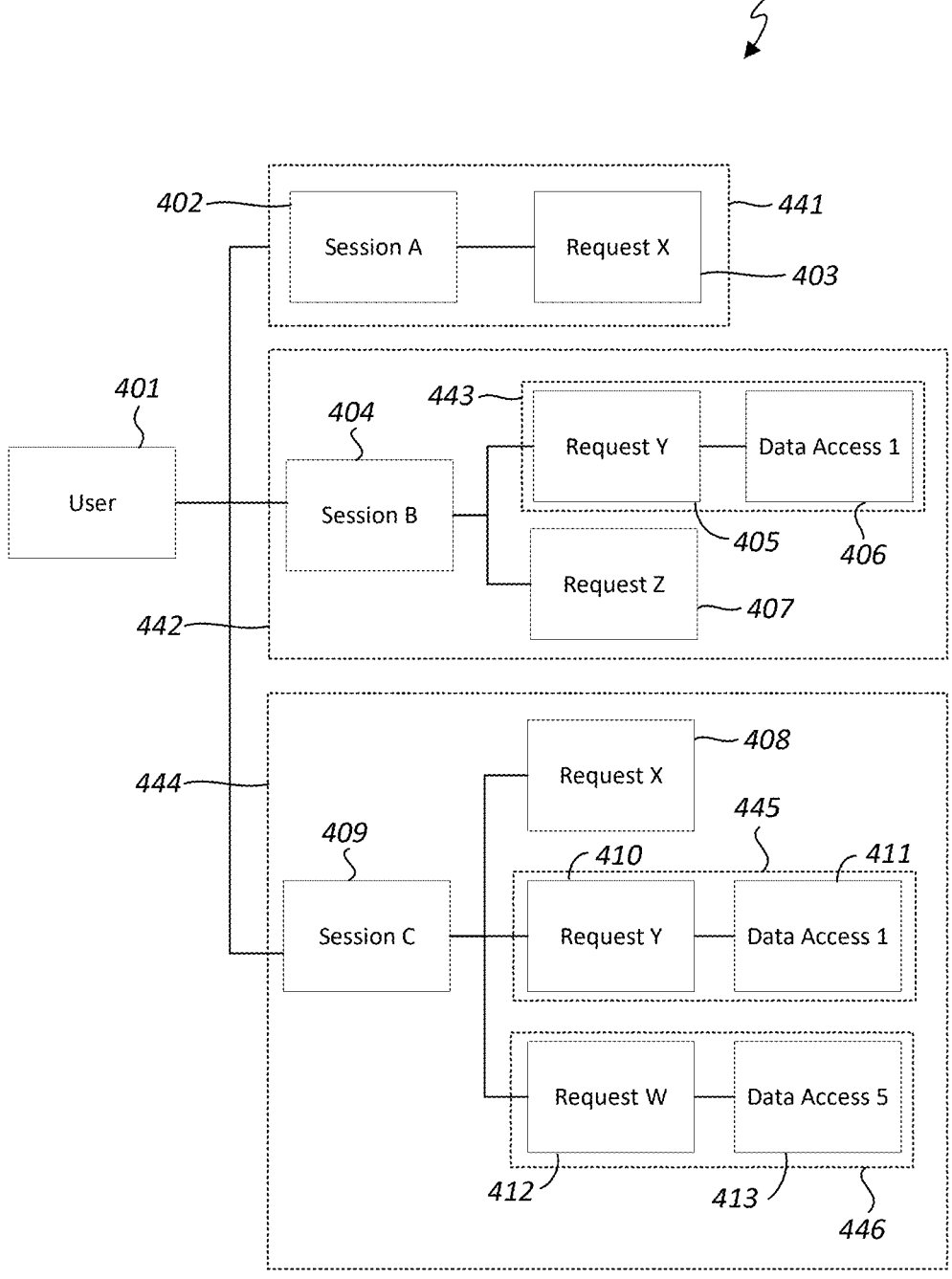
FIG. 7 shows activity subgraphs of the activity graph of FIG. 6, in accordance with an embodiment of the present invention.

FIG. 7 shows activity subgraphs 441-446 of the activity graph 400, in accordance with an embodiment of the present invention. In the example of FIG. 7, the activity subgraph 441 consists of nodes 402 and 403; the activity subgraph 442 consists of nodes 404-407; the activity subgraph 443 consists of nodes 405 and 406; the activity subgraph 444 consists of nodes 408-413; the activity subgraph 445 consists of nodes 410 and 411; and the activity subgraph 446 consists of nodes 412 and 413. The number of activity subgraphs in an activity graph and the members of an activity subgraph depend on the algorithm employed to identify the activity subgraphs.

The activity subgraphs 441-446 are hierarchical. The activity graph 400 is a parent to children activity subgraphs 441-446; the activity of subgraph 442 is a parent to child activity subgraph 443, node 404, and node 407; the activity subgraph 444 is a parent to children activity subgraph 445, activity subgraph 446, node 408, and node 409; and so on. The activity subgraphs of the activity graph 400 may displayed on a visualization overlayed on corresponding network subgraphs that are aligned thereto.

Figure 8:
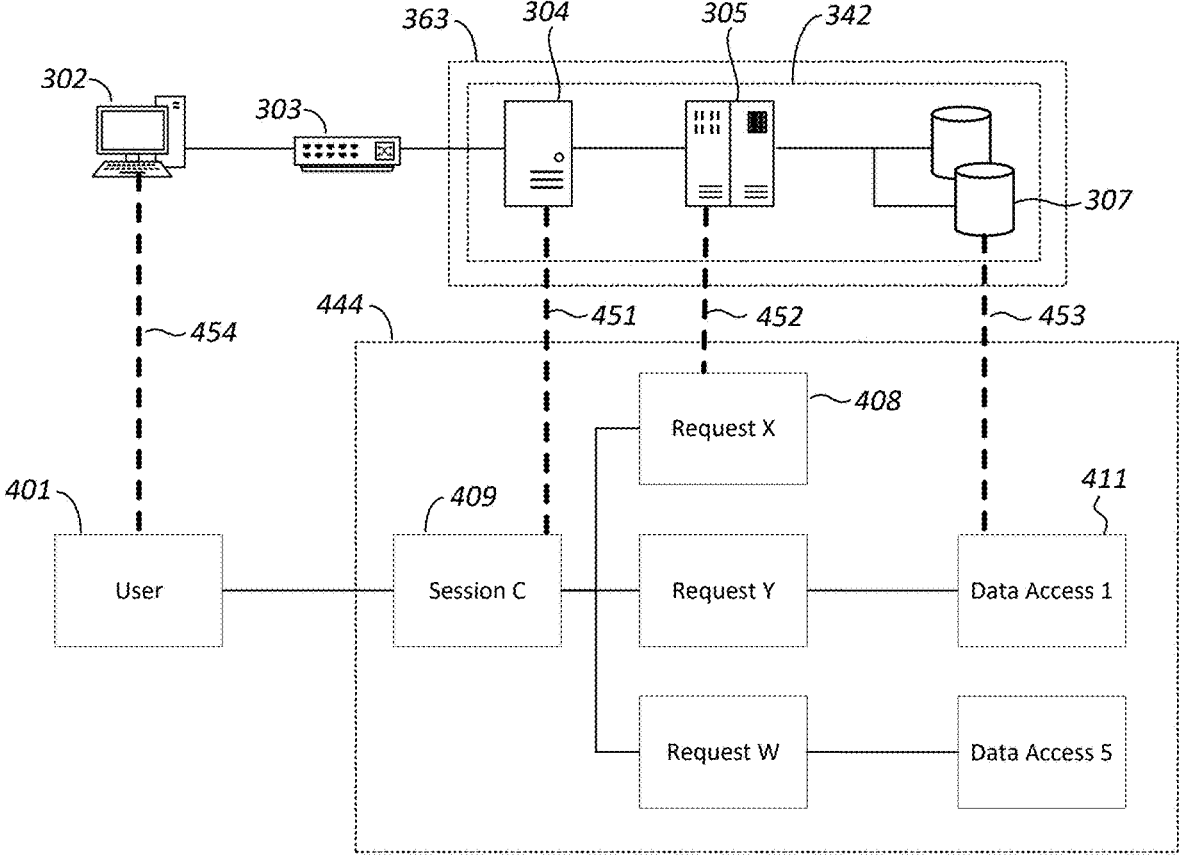
FIG. 8 illustrates alignment of activity subgraphs to network subgraphs, in accordance with an embodiment of the present invention.

FIG. 8 illustrates alignment of activity subgraphs to network subgraphs, in accordance with an embodiment of the present invention. The alignment maps network assets associated with activities in the activity subgraphs to network assets of network subgraphs. In the example of FIG. 8, the activity subgraph 444 is found to be similar, by Jaccard similarity, to the network subgraph 363, which is a cluster of the network subgraphs 342, 343, and 344 (see FIG. 5). More particularly, in the example of FIG. 8, the network assets associated with Session C (node 409), Request X (node 408) and Data Access 1 (node 411) are the same as the network assets in the network subgraph 363 (see dashed lines 451, 452, and 453). The activity subgraph 444 is thus aligned to the network subgraph 363.

In the example of FIG. 8, the node 401 represents a user on the network asset 302 (see dashed line 454). However, the network asset 303 is not in the connection path "node 401/subgraph 444". This lowers the Jaccard similarity of the connection path of "network asset 302/network asset 303/network subgraph 363" to connection path "node 401/subgraph 444." Accordingly, "node 401/subgraph 444" is not aligned to "network asset 302/network asset 303/network subgraph 363". The alignment is performed for all activity and network subgraphs to generate an alignment graph, which provides a mapping of activity subgraphs to similar network subgraphs.

Figure 9:
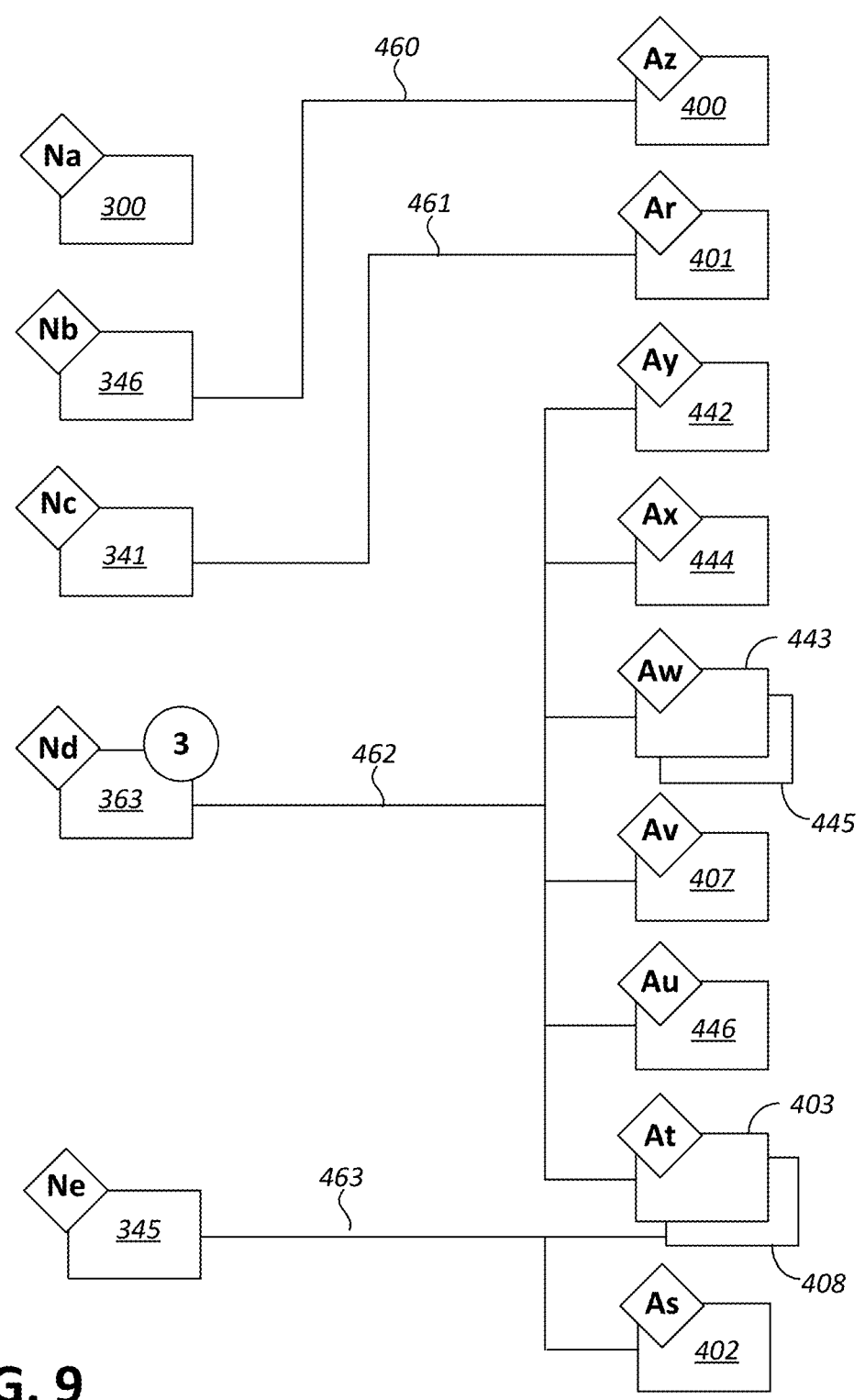
FIG. 9 further illustrates alignment of activity subgraphs to network subgraphs, in accordance with an embodiment of the present invention.

FIG. 9 further illustrates alignment of activity subgraphs to network subgraphs, in accordance with an embodiment of the present invention. In the example of FIG. 9, the left side shows the network graph 300 after clustering, and the right side shows the activity graph 400 after identification of the activity subgraphs. The network graph 300 and the activity graph 400 are each considered a subgraph for alignment and similarity comparison purposes.

In the example of FIG. 9, the entire network graph 300 is not mapped to any subgraph of the activity graph 400; the network subgraph 346 is mapped to the activity graph 400 (see arrow 460); the network subgraph 341 is mapped to the activity subgraph 401 (see arrow 461); the network subgraph 363 is mapped to the activity subgraphs 442, 444, 443, 445, 407, 446, and 403 (see arrow 462); and the network subgraph 345 is mapped to the activity subgraphs 408 and 402 (see arrow 463).

In the example of FIG. 9, each of the network and activity subgraphs is labeled with its vector representation. More particularly, Na is the vector of the network subgraph 300, Nb is the vector of the network subgraph 346, Nc is the vector of the network subgraph 341, Nd is the vector of the network subgraph 363, Az is the vector of the activity graph 400, Ar is the vector of the activity subgraph 401, Ay is the vector of the activity subgraph 442, etc.

Figure 10:
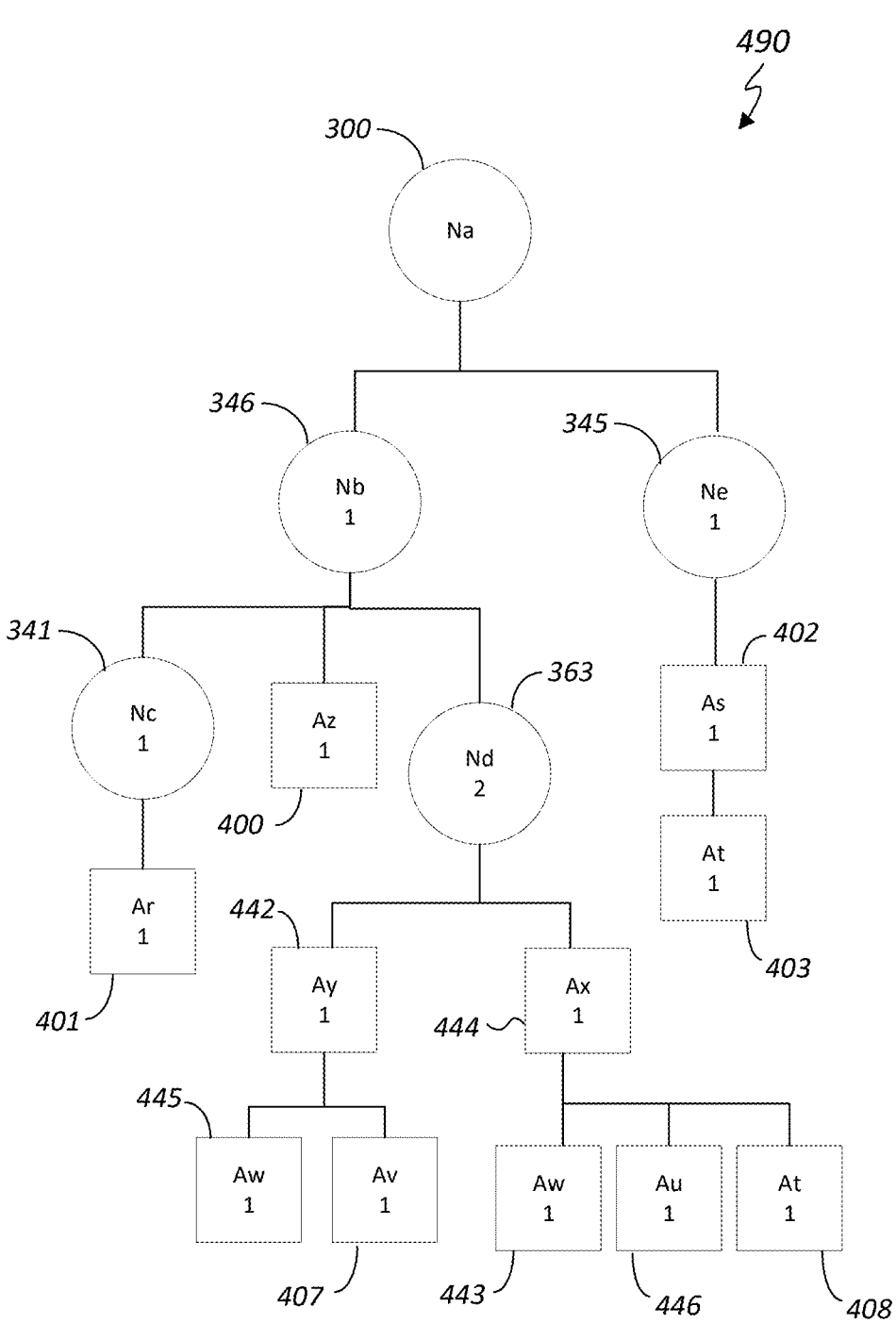
FIG. 10 shows an alignment graph, in accordance with an embodiment of the present invention.

FIG. 10 shows an alignment graph 490, in accordance with an embodiment of the present invention. The alignment graph 490 shows another way to illustrate the alignment of the activity subgraphs of the activity graph 400 to the network subgraphs of the network graph 300. The alignment graph 490 shows the alignment in hierarchical fashion. In the example of FIG. 10, each node shows the corresponding vector, and the numerical value under the vector is a similarity hit count of the node. As will be more apparent below, the alignment graph 490 is traversed from the highest level node (i.e., node representing the network graph 300) to lower level nodes to determine similarity between activity subgraphs that are aligned to the same network subgraph. The hit count of a node is incremented (by one) each time similarity with the node is found.

In the example of FIG. 10, the activity subgraph 402 (with a vector As and a hit count of 1) and the activity subgraph 403 (with a vector At and a hit count of 1) are aligned to the network subgraph 345 (with a vector Ne and 1 hit count); the activity subgraph 442 (with a vector Ay and a hit count of 1) and the activity subgraph 444 (with a vector Ax and a hit count of 1) are aligned to the network subgraph 363 (with a vector Nd and 2 hit counts); the network subgraph 346 (with a vector Nb and 1 hit count) is the parent of the network subgraph 363 and the network subgraph 341 (with a vector Nc and 1 hit count). The hit count of a network subgraph is the total of hit counts of its directly-connected, child activity subgraphs in the alignment graph. For example, the hit count of the node 363 is 2, because the nodes 442 and 444 each has a hit count of 1.

Figure 11:
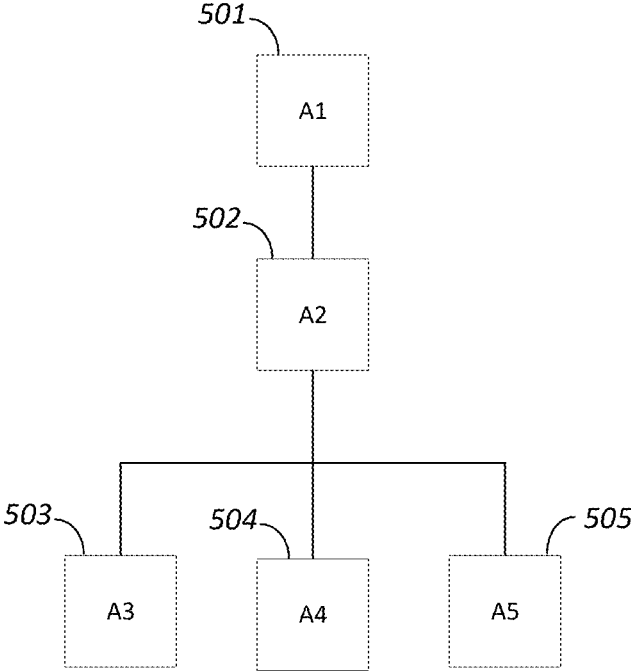
FIG. 11 shows example activity subgraphs, in accordance with an embodiment of the present invention.

FIG. 11 shows example activity subgraphs 501-55, in accordance with an embodiment of the present invention. Each of the activity subgraph 501-505 is depicted with its vector representation. For example, the activity subgraph 501 has vector A1; the activity subgraph 502 has a vector A2; etc.

To identify an activity subgraph that is similar to another activity subgraph that is aligned to the same network subgraph, the alignment graph is traversed from top level to bottom levels of the hierarchy. More particularly, the activity subgraph is compared to network subgraphs in the alignment graph by Jaccard similarity to find the network subgraph to align the activity subgraph to. Once the activity subgraph is aligned to a network subgraph, the vector of the activity subgraph is then compared to vectors of other activity subgraphs aligned to the same network subgraph to find the most similar activity subgraph that is aligned to the same network subgraph.

As a first traversal example through the alignment graph 490 (shown in FIG. 12), assume comparing the activity subgraph 501 to the network graph 300 yields a Jaccard similarity value of 0.5; comparing activity subgraph 501 to the network subgraph 346 yields a Jaccard similarity value of 0.8; comparing activity subgraph 501 to the network subgraph 345 yields a Jaccard similarity value of 0.2; comparing the activity subgraph 501 to the network subgraph 341 yields a Jaccard similarity value of 0.1; and comparing the activity subgraph 501 to the network subgraph 363 yields a Jaccard similarity value of 0.6. The activity subgraph 501 is found to be most similar to the network subgraph 346 relative to the other network subgraphs. The activity subgraph 501 is therefore aligned to the network subgraph 346, and the hit count of the network subgraph 346 is incremented.

The activity graph 400 is found to be aligned to the same network subgraph, i.e., network subgraph 346. Comparing the vector A1 of the activity subgraph 501 to the vector Az of the activity graph 400 yields a similarity value of 0.8. Given a primary threshold of 0.7, the activity subgraph 501 is found to exceed the primary threshold and is similar to the activity graph 400. The hit count of the activity graph 400 is therefore incremented.

The first traversal example continues with the next activity subgraph that is directly connected to the activity subgraph 501. Assume comparing the activity subgraph 502 to the network subgraph 346 yields a Jaccard similarity value of 0.7; comparing the activity subgraph 502 to the network subgraph 341 yields a Jaccard similarity value of 0.2; and comparing the activity subgraph 502 to the network subgraph 363 yields a Jaccard similarity value of 0.9. In this case, the activity subgraph 502 is found to be most similar to the network subgraph 363 relative to the other network subgraphs. The activity subgraph 502 is therefore aligned to the network subgraph 363, and the hit count of the network subgraph 363 is incremented.

Continuing the first traversal example, the activity subgraphs 442 and 444 are also aligned to the network subgraph 363. Assume comparing the vector A2 of the activity subgraph 502 to the vector Ay of the activity subgraph 442 yields a similarity value of 0.4; and comparing the vector A2 of the activity subgraph 502 to the vector Ax of the activity subgraph 444 yields a similarity value of 0.9. In this case, with the primary threshold of 0.7, the activity subgraph 502 is found to exceed the primary threshold and is similar to the activity subgraph 444. The hit count of activity subgraph 444 is incremented. So far, no anomalous activity has been detected, because the activity subgraph 501 is aligned to the network subgraph 346, and the activity graph 400 that is also aligned to the network subgraph 346 is similar to the activity subgraph 501. Also, the activity subgraph 502 is aligned to the network subgraph 363, and the activity subgraph 444 that is also aligned to the network subgraph 346 is similar to the activity subgraph 502. Activities in the activity subgraphs 501 and 502 are thus deemed to be normal activities in the first traversal example.

Figure 12:
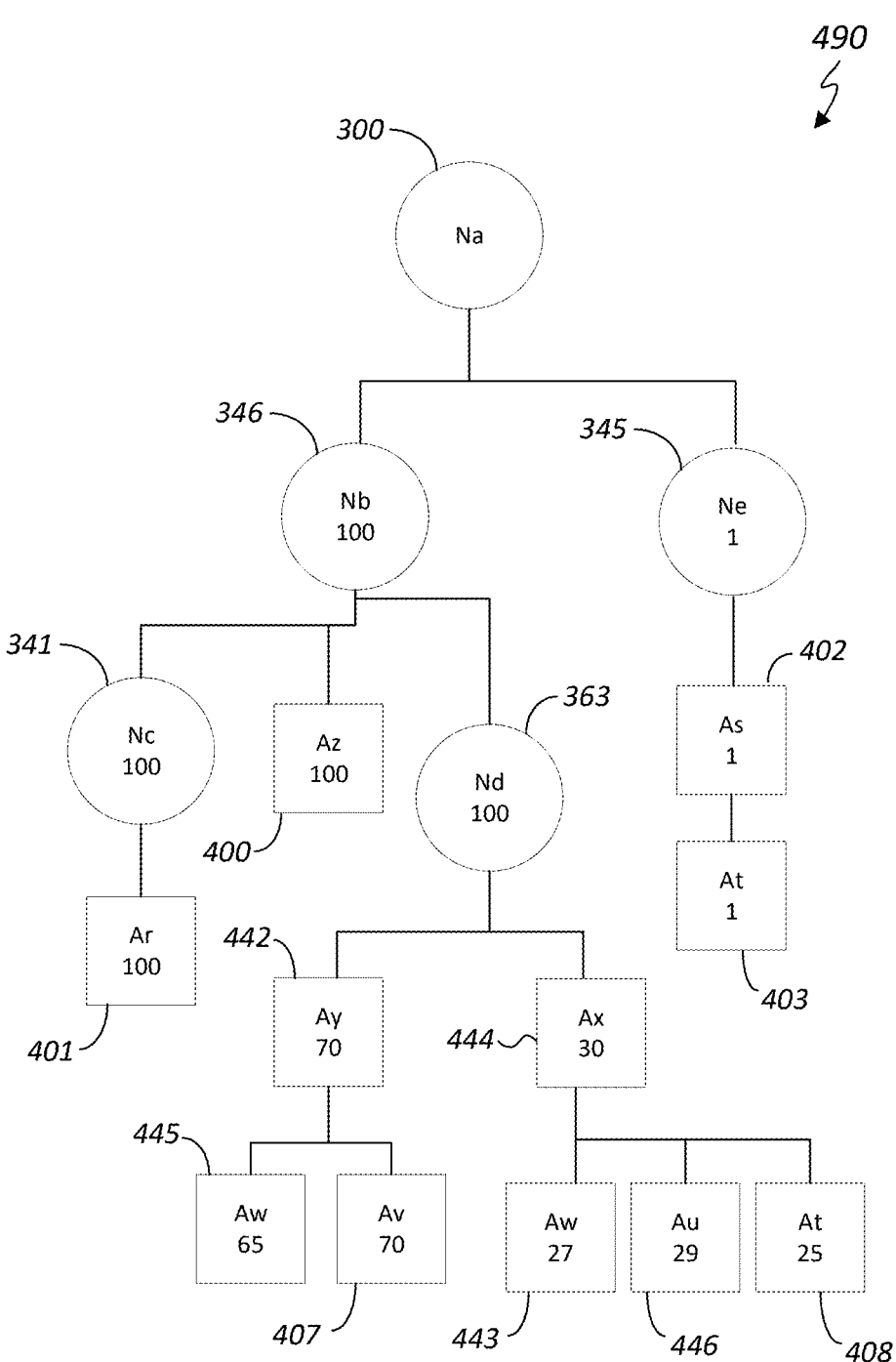
FIG. 12 shows hit counts of network and activity subgraphs in the alignment graph of FIG. 10 over time, in accordance with an embodiment of the present invention.

The hit counts of the network and activity subgraphs in the alignment graph 490 will accumulate as more activity subgraphs are evaluated for anomaly. FIG. 12 shows the hit counts of network and activity subgraphs in the alignment graph 490 over time.

Figure 13:
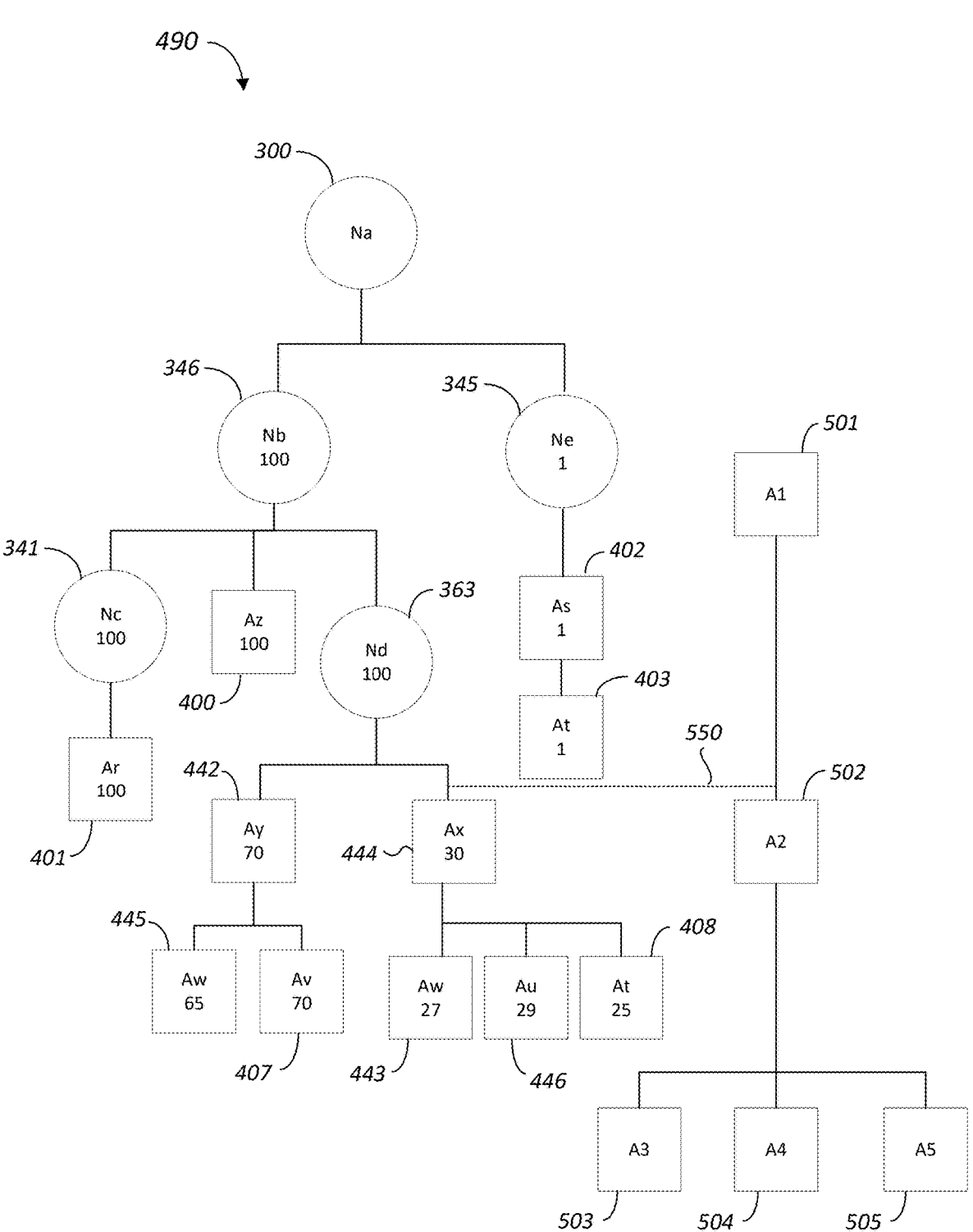
FIG. 13 illustrates an example where an activity subgraph is not similar enough to other activity subgraphs that are aligned to the same network subgraph, in accordance with an embodiment of the present invention.

FIG. 13 illustrates an example where the activity subgraph 502 is not similar enough, i.e., does not meet the primary threshold, to activity subgraphs that are aligned to the same network subgraph.

Referring to FIG. 13, in a second traversal example through the alignment graph 490, the activity subgraph 501 is found to be aligned to the network subgraph 363 and is similar to the activity graph 400 as in the first traversal example. Also in the second traversal example, the activity subgraph 502 is found to be aligned to the network subgraph 363 as in the first traversal example. However, assume comparing the vector A2 of the activity subgraph 502 to vector Ay of the activity subgraph 442 yields a similarity value of 0.1; and comparing the vector A2 of the activity subgraph 502 to vector Ax of the activity subgraph 444 yields a similarity value of 0.2. In this case, with the primary threshold of 0.7, neither the activity subgraph 442 nor the activity subgraph 444 (i.e., the activity subgraphs that are aligned to the network activity subgraph 363) is not similar enough to the activity subgraph 501.

Because the activity subgraph 502 is not similar to any of the activity subgraphs that are aligned to the same network subgraph as the activity subgraph 502, the activity subgraph 502 is given an activity score that is based on the total hit count of the network subgraph aligned to the activity subgraph 502, i.e., the total hit count of the network subgraph 363. In this example, the total hit count is 101, i.e., the hit count of the network subgraph 363 before the activity subgraph 502 (i.e., 100) plus an increment of one for the activity subgraph 502. In one embodiment, the activity score of an activity subgraph is the reciprocal of the hit count of the network subgraph to which the activity subgraph is aligned, which is $1/101$ in this particular example.

The activity score is a measure of similarity relative to frequency of occurrence. The higher the activity score, the more normal the activity. As can be appreciated, other suitable metric for determining an activity score may also be employed without detracting from the merits of the present invention. For example, other ways of generating hit counts or normalizing similarity values with frequency of occurrence may also be employed.

The activity score is compared to an activity threshold to determine if the activity subgraph 502 indicates an anomaly. More particularly, the activities of the activity subgraph 502 are deemed to be normal when the activity score is equal to or greater than the activity threshold, and are deemed to be an anomaly when the activity score is less than the activity threshold. The activity subgraph 502 and other lower level activity subgraphs that are connected to the activity subgraph 502 (i.e., subgraphs 503-505) are aligned to the network subgraph 363, separately from the activity subgraphs 442 and 444. In the example of FIG. 13, a dashed line 550 illustrates the point where the activity subgraph 502 is added to the alignment graph 490.

As can be appreciated, embodiments of the present invention allow for detection of anomalous activities, as well as providing risk assessments in a manner that facilitates evaluation by security personnel.

Referring now to FIG. 14, there is shown a flow diagram of a method 600 of providing risk assessments of an enterprise network, in accordance with an embodiment of the present invention.

In step 601, a network graph of network assets of the enterprise network is created. The network assets are computing components that have network interfaces. The network graph has nodes and edges, with the network assets being nodes of the network graph and connections between network interfaces of the network assets being edges of the network graph.

In step 602, network subgraphs of the network graph are identified. The network subgraphs are hierarchical subgraphs of the network graph.

In step 603, network subgraphs that are similar are clustered together.

In step 604, after clustering the network subgraphs, the network graph is displayed at different hierarchical levels as a visualization on a display screen. A node on the network graph on the visualization may be a discrete node or a common node, with the discrete node being a single asset network asset and a common node being a representation of a plurality of network assets that are in network subgraphs.

In step 605, nodes of the network graph on the visualization may be contracted or expanded by the user, such as security personnel of the enterprise network. For example, the user may select a common node to reveal the plurality of network assets represented by the common node. The user may also select an option to contract the plurality of network assets to the common node.

In step 606, risk assessments of the network assets are overlaid on corresponding nodes of the network graph on the visualization. A risk assessment overlaid on a common node may be an aggregation of risk assessments of network assets represented by the common node. A risk assessment may also be an activity graph that is overlaid on corresponding nodes on the network graph. In that example, the risk assessment may include an indication of whether or not the activities of the activity graph are anomalous.

Figure 15:
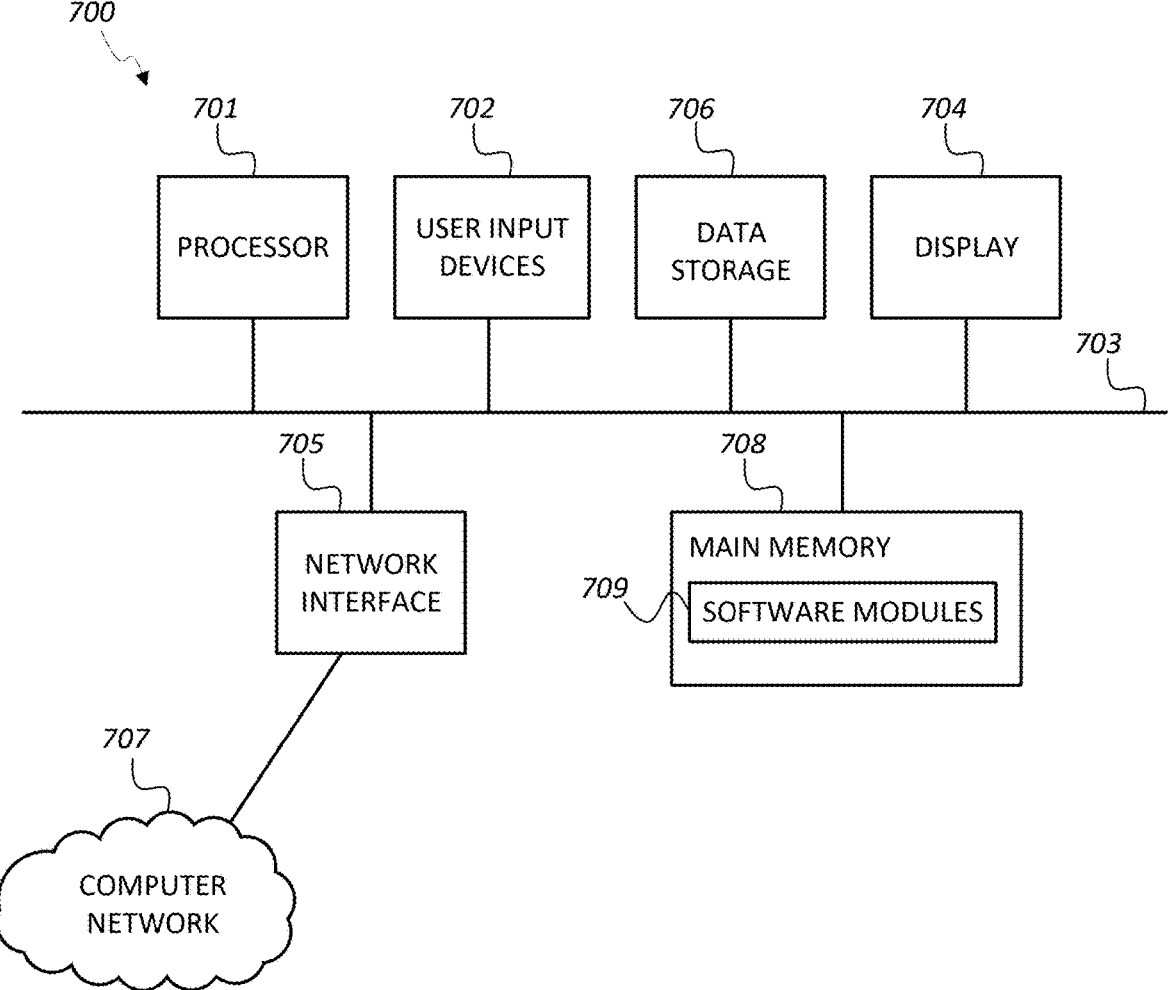
FIG. 15 shows a block diagram of a computer system that may be employed with embodiments of the present invention.

FIG. 15 shows a block diagram of a computer system 700 that may be employed with embodiments of the present invention. The computer system 700 may be employed as a backend system, network asset, or other computing component described herein. The computer system 700 may include one or more processors 701. The computer system 700 may have one or more buses 703. The computer system 700 may include one or more user input devices 702 (e.g., keyboard, mouse), one or more data storage devices 706 (e.g., hard drive, optical disk, solid state drive), a display screen 704 (e.g., liquid crystal display, flat panel monitor), a computer network interface 705 (e.g., network adapter, modem), and a main memory 708 (e.g., random access memory). The computer network interface 705 may be coupled to a computer network 707, which in this example includes the Internet.

The computer system 700 is a particular machine as programmed with one or more software modules 709, comprising instructions stored non-transitory in the main memory 708 for execution by at least one processor 701 to cause the computer system 700 to perform corresponding programmed steps. An article of manufacture may be embodied as computer-readable storage medium including instructions that when executed by at least one processor 701 cause the computer system 700 to be operable to perform the functions of the one or more software modules 709.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting anomalous activities in an enterprise network, the method comprising:

transforming network attributes of network assets of an enterprise network into a network graph, each of the network assets comprising a computing component with a network interface;

transforming activities that occurred on the enterprise network into an activity graph;

aligning activity subgraphs of the activity graph to network subgraphs of the network graph based on network assets that are associated with activities represented in the activity subgraphs;

determining similarity of a target activity subgraph to other activity subgraphs that are aligned to a same network subgraph as the target activity subgraph; and detecting that activities represented in the target activity subgraph are anomalous based at least in response to the target activity subgraph not being similar to any of the other activity subgraphs that are aligned to the same network subgraph as the target activity subgraph.

2. The method of claim 1, further comprising:

identifying hierarchical subgraphs of the network graph to find the network subgraphs; and identifying hierarchical subgraphs of the activity graph to find the activity subgraphs.

3. The method of claim 1, wherein aligning the activity subgraphs of the activity graph to the network subgraphs of the network graph includes:

calculating Jaccard similarity values of the activity subgraphs of the activity graph and the network subgraphs of the network graph; and mapping activity subgraphs to similar network subgraphs based on the Jaccard similarity values.

4. The method of claim 1, further comprising:

describing each of the network subgraphs with a vector; and clustering the network subgraphs based on corresponding vectors of the network subgraphs.

5. The method of claim 1, further comprising:

displaying the network graph as a visualization on a display screen of an endpoint computer;

on the visualization, displaying a set of network subgraphs of the network graph as a common node; and on the visualization, expanding the common node to display the set of network subgraphs in response to selection of the common node by a user of the endpoint computer.

6. The method of claim 5, further comprising:

overlaying an aggregation of risk assessments of the set of network subgraphs on the common node.

7. An enterprise network comprising:

a plurality of network assets, each of the plurality of network assets comprising a computing component with a network interface;

a backend system comprising at least one processor and a memory, the memory of the backend system storing instructions that when executed by the at least one processor of the backend system cause the backend system to:

receive network attributes of the plurality of network assets;

transform the network attributes into a network graph;

receive events data of a plurality of activities on the enterprise network;

transform the plurality of activities into an activity graph;

create an alignment graph that maps activity subgraphs of the activity graph to network subgraphs of the network graph;

determine similarity of a target activity subgraph to other activity subgraphs that are aligned to a same network subgraph as the target activity subgraph in the alignment graph; and detect that activities represented in the target activity subgraph are anomalous based at least in response to the target activity subgraph not being similar to any of the other activity subgraphs that are aligned to the same network subgraph as the target activity subgraph; and an endpoint computer comprising a display screen, at least one processor, and a memory, the memory of the endpoint computer storing instructions that when executed by the at least one processor of the endpoint computer cause the endpoint computer to display the network graph as a visualization on the display screen.

8. The system of claim 7, wherein the instructions stored in the memory of the endpoint computer when executed by the at least one processor of the endpoint computer cause the endpoint computer to:

on the visualization, display a set of network subgraphs of the network graph as a common node; and on the visualization, expand the common node to display the set of network subgraphs in response to selection of the common node by a user of the endpoint computer.

9. The system of claim 7, wherein the instructions stored in the memory of the endpoint computer when executed by the at least one processor of the endpoint computer cause the endpoint computer to overlay an aggregation of risk assessments on the common node on the visualization.

\* \* \* \* \*